United States Patent
Tanaka

[11] Patent Number: 6,089,736
[45] Date of Patent: Jul. 18, 2000

[54] LIGHTING FIXTURE EQUIPPED WITH REFLEX REFLECTOR, FOR VEHICLES

[75] Inventor: Hidemi Tanaka, Tokyo, Japan

[73] Assignee: Stanley Electric Co., Ltd., Tokyo, Japan

[21] Appl. No.: 09/235,685

[22] Filed: Jan. 22, 1999

[30] Foreign Application Priority Data

Jan. 23, 1998 [JP] Japan ............................. 10-011484

[51] Int. Cl.[7] ............................................ F21V 7/00
[52] U.S. Cl. ...................... 362/520; 362/516; 362/518
[58] Field of Search ................................. 362/509, 514, 362/516, 520, 518, 301, 307, 507

[56] References Cited

U.S. PATENT DOCUMENTS

| | | | |
|---|---|---|---|
| 5,448,454 | 9/1995 | Nonaka | 362/546 |
| 5,552,969 | 9/1996 | Murakami | 362/520 |
| 5,566,057 | 10/1996 | Iwami | 362/549 |

*Primary Examiner*—Sandra O'Shea
*Assistant Examiner*—Hargobind S. Sawhney
*Attorney, Agent, or Firm*—Ostrolenk, Faber, Gerb & Soffen, LLP

[57] ABSTRACT

A lighting fixture equipped with a reflex reflector, for vehicles includes a transparent outer lens, a housing, and a light source. The reflex reflector is provided in an internal surface of the housing at a location at which incident light can be reflected through the outer lens in a predetermined direction, such that a surface of the reflex reflector and the internal surface of the housing are arranged on the same plane. The reflex reflector has a rear surface thereof covered with a rear cover in order to prevent a reflecting cut surface of the reflex reflector from being covered with dust. If an ornamental plate is provided within a light body of the lighting fixture, the reflex reflector is integrally formed with the ornamental plate, or alternatively separately formed from the same. In both the cases, the surface of the reflex reflector and the internal surface of the ornamental plate are arranged on the same plane.

8 Claims, 3 Drawing Sheets

6,089,736

LIGHTING FIXTURE EQUIPPED WITH REFLEX REFLECTOR, FOR VEHICLES

FIELD OF THE INVENTION

This invention relates to a lighting fixture for vehicles, and more particularly to a lighting fixture of this kind, which has a light body equipped with a reflex reflector for reflecting light irradiated from an oncoming vehicle to the same vehicle.

DESCRIPTION OF THE PRIOR ART

The construction of a conventional lighting fixture equipped with a reflex reflector, for vehicles will be described below with reference to a front turn signal lamp, for instance. FIG. 4 shows a conventional front turn signal lamp designated by reference numeral 90. The front turn signal lamp 90 includes a light body 93 formed of an outer lens 91 and a housing 92 provided with a reflecting mirror 92a, and a light source 94 arranged in the light body 93.

Mounted on a rear surface (internal surface) side of the outer lens 91 at a suitable location thereof is a reflex reflector 95 that is formed as a separate member. The reflex reflector is connected to the outer lens 91 via a joint portion 91a thereof in one body by means such as ultrasonic welding. The reflex reflector 95 is formed, e.g. of a transparent amber resin member. The area of the outer lens 91 on which the reflex reflector 95 is mounted has no lens cut so that the function of the reflex reflector 95 is not damaged. In the figure, reference numeral 96 designates a vacuum deposition film formed of aluminum or the like, for imparting a function of reflecting light to the reflecting mirror 92a.

In recent years, however, there is a trend to favor an outer lens 91 that is plain or transparent from a designing standpoint. To follow the trend, the reflecting mirror 92a is formed by a composite reflecting surface such that a desired light distribution characteristic of the lighting fixture is obtainable by the reflecting mirror 92 per se. Therefore, the outer lens 91 is made almost plain or transparent without having a lens cut.

The formation of the plain outer lens 91 as mentioned above can unfavorably cause the following inconveniences: That is, cells generated by ultrasonic welding performed at the joint portion 91a can enter the area of the outer lens, on which the reflex reflector 95 is mounted. This causes irregular reflection of light or deformation of the reflex reflector, which is apparently observed from the outside of the outer lens 91, resulting in impaired appearance of the lighting fixture.

Further, since the reflex reflector 95 is mounted on the outer lens 91 in one body, an effective area of the outer lens 91 is reduced by the area of the reflex reflector 95. As a result, the formation of the light distribution characteristic, e.g. as a front turn signal, which is the essential function of the lighting fixture 90, can be rendered difficult.

To overcome the above inconvenience of impaired appearance of the lighting fixture, another technique is proposed. According to the construction of a lighting fixture proposed by the technique, as shown in FIG. 5, an ornamental plate 97 is provided along an internal surface of the outer lens 91, and the reflex reflector 95 is mounted on the ornamental plate 97, to thereby prevent the appearance from being degraded. This technique, however, can cause another inconvenience. That is, in this technique, a projection amount of the ornamental plate 97 and the reflex reflector 95 toward the interior of the light body 93 becomes large, resulting in interruption of optical paths from the light source 94 and the reflecting mirror 92a, to thereby render it difficult to form the light distribution characteristic.

SUMMARY OF THE INVENTION

Therefore, it is an object of the invention to provide a new lighting fixture for vehicles, which does not have its appearance impaired nor affect a light distribution characteristic thereof.

To attain the object, according to a first aspect of the invention, there is provided a lighting fixture equipped with a reflex reflector, for a vehicle, including a transparent outer lens, a housing, a light source, and the reflex reflector, wherein the reflex reflector is provided in an internal surface of the housing at a location at which incident light can be reflected through the outer lens in a predetermined direction, such that a surface of the reflex reflector and the internal surface of the housing are arranged on the same plane.

Preferably, the housing is formed of a transparent amber resin member and integrally formed with the reflex reflector, and the housing is subjected to an opaque process except for a region corresponding to the reflex reflector.

More preferably, the reflex reflector has an external surface thereof covered with a cover member.

According to a second aspect of the invention, there is provided a lighting fixture equipped with a reflex reflector, for a vehicle, including a transparent outer lens, a housing, a light source, and the reflex reflector, the lighting fixture comprising an ornamental plate provided in an interior of the housing and along the housing, and wherein the reflex reflector is provided on an internal surface of the ornamental plate at a location at which incident light can be reflected through the outer lens in a predetermined direction, such that a surface of the reflex reflector and the internal surface of the housing are arranged on the same plane.

Preferably, the ornamental plate is formed of a transparent amber resin member and integrally formed with the reflex reflector, and wherein the ornamental plate is subjected to an opaque process except for a region corresponding to the reflex reflector.

According to a third aspect of the invention, the reflex reflector is separately formed from both the housing and the ornamental plate.

Preferably, the ornamental plate has a fitting opening formed therein, the reflex reflector being united with the ornamental plate in one body, by being mounted in the fitting opening.

The above and other object, features, and advantages of the invention will be more apparent from the following detailed description taken in conjunction with the accompanying drawings.

DESCRIPTION OF THE PREFERRED EMBODIMENTS

The invention will now be described in detail with reference to the drawings showing embodiments thereof.

Figure 1:
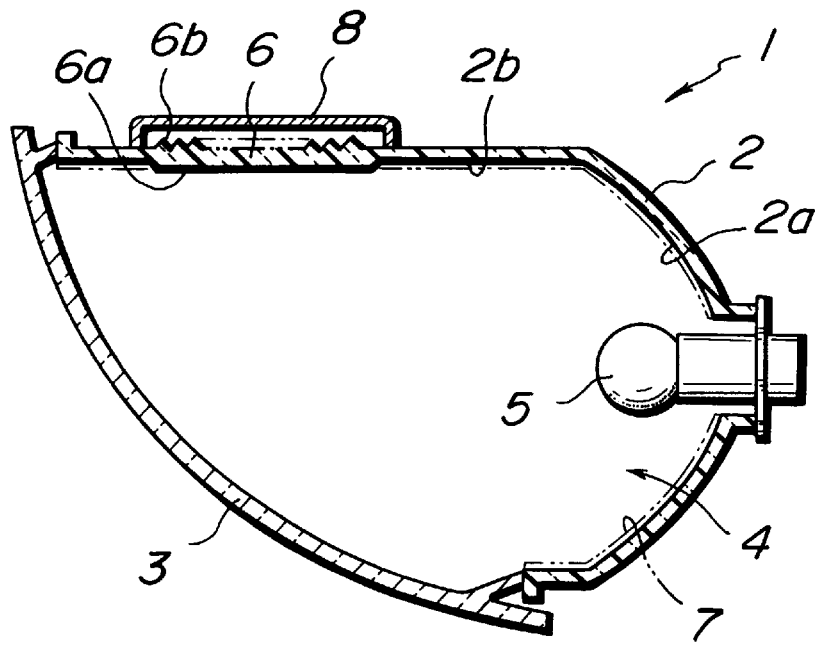
FIG. 1 is a cross-sectional view showing a lighting fixture equipped with a reflex reflector, for vehicles, according to a first embodiment of the invention.

Referring first to FIG. 1, there is schematically illustrated a lighting fixture equipped with a reflex reflector, for vehicles, according to a first embodiment of the invention. Reference numeral 1 designates the lighting fixture equipped with the reflex reflector (hereinafter simply referred to as "the lighting fixture 1 with RR") which has a light body 4 comprising a housing 2 and an outer lens 3. The light body 4 has its interior provided with a light source 5 and a reflecting mirror 2a, etc., and functions as a turn signal lamp or the like.

The light body 4 is equipped with a reflex reflector 6 (hereinafter simply referred to as "the RR 6"). The outer lens 3 has no lens cut and is plain or transparent in keeping with a trend in recent years. Therefore, it is not preferable from a standpoint of ensuring appearance that other members are formed on a rear surface of the outer lens 3 in one body by ultrasonic welding or the like.

According to the present embodiment, the housing 2 is molded, e.g. of an transparent amber resin member, and at the time of molding the housing 2, the RR 6 is integrally molded with the housing 2. The location of the RR 6 should be a location at which the outer lens 3 does not damage the function of the RR 6 to receive light from a predetermined direction and to reflect and return the light in the predetermined direction, and hence does not block the light.

Further, at the time of molding the housing 2, an internal surface 2b thereof and a surface 6a of the RR 6 are formed so as to be arranged on almost the same plane. Since the whole housing 2 is formed of the transparent resin member, a region corresponding to the RR 6 achieves its function. On the other hand, a region other than the RR 6 does not achieve its function as the housing 2, since light transmits the region. According to the present embodiment, to form a reflecting mirror 2a, an opaque process is carried out by applying a vacuum deposition film 7 formed of aluminum on the region other than the surface 6a of the RR 6. Therefore, the step of the opaque process mentioned above is not different from that in the conventional technique.

In the construction of the lighting fixture described above, a reflecting cut surface 6b of the RR 6 is placed outside the housing 2. Therefore, there is a fear that the reflecting cut surface 6b can be covered with dust to damage the function of the RR 6, depending on an attached condition of the lighting fixture 1 with RR to the vehicle. To cope with this inconvenience, in the present embodiment the reflecting cut surface 6b is covered with a rear cover 8 to prevent attachment of dust thereto.

As described hereinabove, according to the embodiment, the RR 6 is integrally molded with the housing 2 at the suitable location thereof, and therefore degraded appearance of the light body 4 caused by forming a separate RR on the plain outer lens 3 by ultrasonic welding can be prevented. Further, when the RR 6 is integrally molded with the housing 2, the internal surface 2b of the housing 2 and the surface 6a of the RR 6 are arranged on the same plane, which prevents optical paths from the light source 5 and the reflecting mirror 2a from being interrupted.

Figure 2:
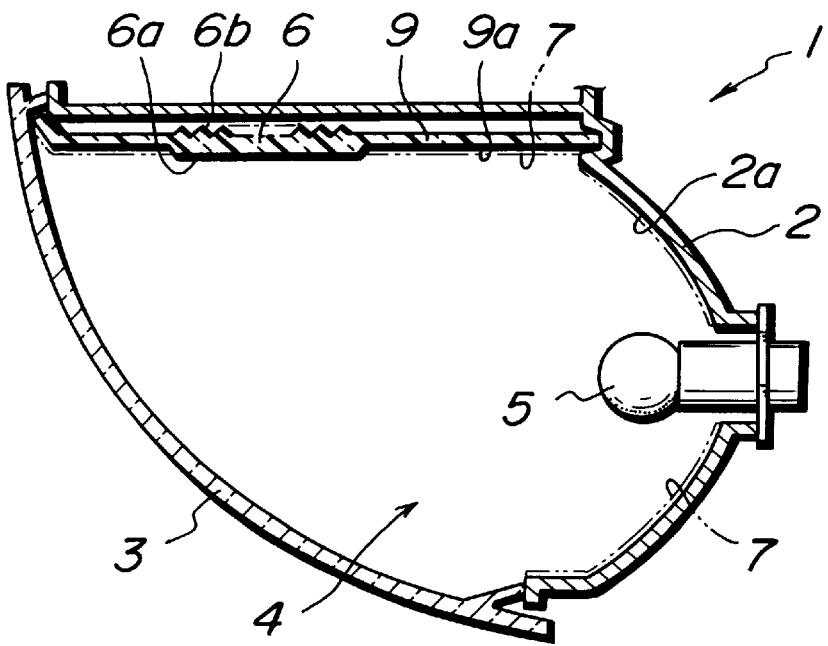
FIG. 2 is a cross-sectional view showing a lighting fixture equipped with a reflex reflector, for vehicles, according to a second embodiment of the invention.

Next, description will be made of a second embodiment according to the invention, which is shown in FIG. 2. In the first embodiment, the RR 6 is integrally molded with the housing 2. In practice, however, if the outer lens 3 of the lighting fixture 1 with RR is made to be transparentized, an ornamental plate 9 is often provided in the light body 4 in order to improve the appearance of the internal surface of the light body 4 which is rendered plainly visible, or in order to partition the interior of the light body 4 according to objects.

In the present embodiment, the RR 6 can be integrally formed with the ornamental plate 9. In this case as well, the ornamental plate 9 is formed by a transparent resin member, and the surface 6a of the RR 6 and the internal surface 9b of the ornamental plate 9 are formed so as to be arranged on almost the same plane. Further, a region of the internal surface 9a of the ornamental plate 9 other than the surface 6a of the RR 6 is subjected to the opaque process by applying the aluminum vacuum deposition film 7 or the like. Therefore, the housing 2 may be formed of an opaque member, as in conventional lighting fixtures.

If the RR 6 is integrally formed with the ornamental plate 9 as described above, the ornamental plate 9 is mounted in the interior of the light body 4, and therefore the reflecting cut surface 6b of the RR 6 is also present within the light body 4. As a result, the reflecting cut surface 6b is free from dust, which dispenses with the rear cover 8 employed in the first embodiment.

Figure 3:
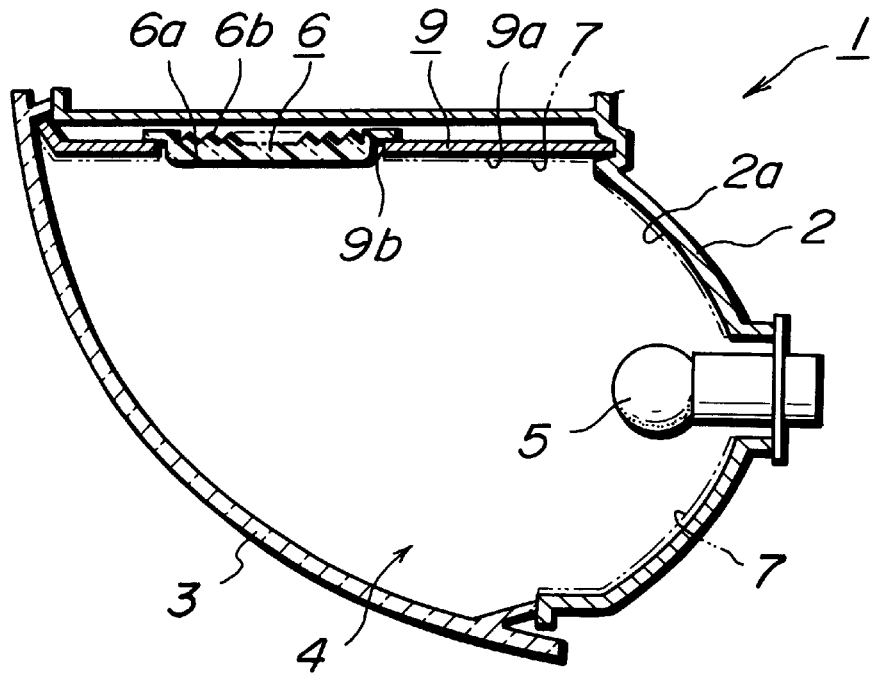
FIG. 3 is a cross-sectional view showing a lighting fixture equipped with a reflex reflector, for vehicles, according to a third embodiment of the invention.
Figure 4:
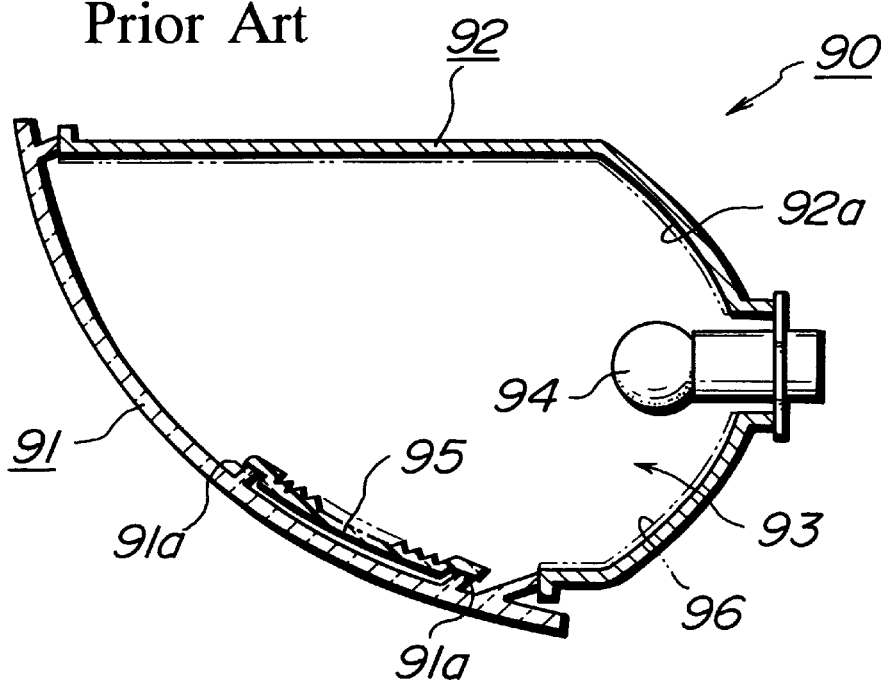
FIG. 4 is a cross-sectional view showing a lighting fixture for vehicles, according to a prior art technique.
Figure 5:
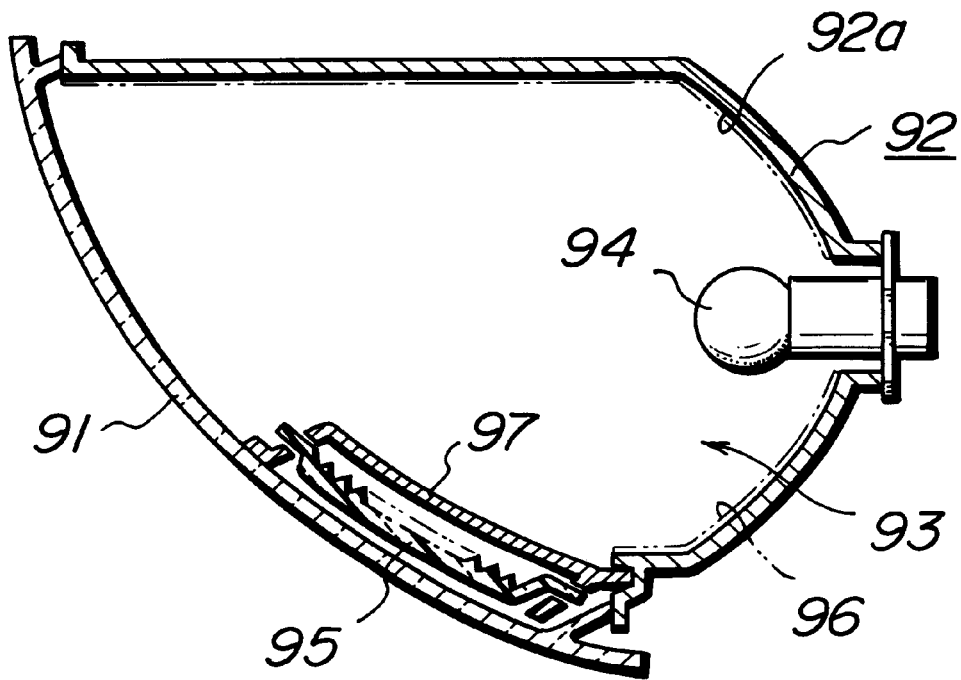
FIG. 5 is a cross-sectional view showing a lighting fixture for vehicles, according to another prior art technique.

FIG. 3 shows a third embodiment of the invention. The RR 6 is integrally formed with the transparentized housing 2 in the first embodiment or with the transparentized ornamental plate 9 in the second embodiment, and the region of the housing 2 or the ornamental plate 9 other than the surface 6a of the RR 6 is subjected to the opaque process. In general, however, a transparent element is relatively expensive, and further the opaque process selectively performed to a certain region makes steps thereof complicated, resulting in an expensive cost.

To overcome these inconveniences, according to the present embodiment, the ornamental plate 9 has an RR-fitting opening 9b formed therein, and is formed of an opaque member separately from the RR 6. The RR 6 separately formed of a transparent member is mounted in the RR-fitting opening 9b from a rear side of the ornamental plate 9 by suitable means such as bonding or fitting, and the ornamental plate 9 united with the RR 6 in one body is mounted in the housing 2. In this case as well, the surface 6a of the RR 6 and the internal surface 9a of the ornamental plate 9 are arranged on almost the same plane.

As described hereinabove, according to the present invention, a reflex reflector is mounted on an internal surface of a housing at a location at which incident light can be reflected in a predetermined direction through an outer lens, such that the reflex reflector and the internal surface of the housing are arranged on the same plane. Alternatively the reflex reflector is arranged on an internal surface of an ornamental plate provided along the housing at the same location as mentioned above, such that the reflex reflector and the internal surface of the ornamental plate are arranged on the same plane. As a result, mounting of the reflex reflector on the outer lens can be dispensed with, which can eliminate an inconvenience of degraded appearance caused by the mounting, leading to excellent effect in improvement in the appearance of the lighting fixtures of this kind.

Further, according to the invention, occupation of the reflex reflector in the effective area of the outer lens can be eliminated, and projection of the same across optical paths from a light source and a reflecting mirror can be prevented. As a result, the lighting fixture with RR according to the invention can positively ensure a light distribution characteristic, to thereby bring excellent effect in improvement in the performance of the lighting fixtures of this kind.

While there has been described what are at present considered to be preferred embodiments of the invention, it will be understood that various modifications may be made thereto, ant it is intended that the appended claims cover all such modifications as fall within the true spirit and scope of the invention.

What is claimed:

1. A lighting fixture equipped with a reflex reflector, for a vehicle, including a transparent outer lens, a housing, a light source, and said reflex reflector, wherein:
    said reflex reflector is provided in an internal surface of said housing at a location at which incident light can be reflected through said outer lens in a predetermined direction, such that a surface of said reflex reflector and said internal surface of said housing are arranged on the same plane.

2. A lighting fixture as claimed in claim 1, wherein said housing is formed of a transparent amber resin member and integrally formed with said reflex reflector, and wherein said housing is subjected to an opaque process except for a region corresponding to said reflex reflector.

3. A lighting fixture as claimed in claim 1, wherein said reflex reflector is separately formed from said housing.

4. A lighting fixture equipped with a reflex reflector as claimed in claim 1, wherein said reflex reflector has an external surface thereof covered with a cover member.

5. A lighting fixture equipped with a reflex reflector, for a vehicle, including a transparent outer lens, a housing, a light source, and said reflex reflector, said lighting fixture comprising:
    an ornamental plate provided in an interior of said housing and along said housing,
    wherein said reflex reflector is provided on an internal surface of said ornamental plate at a location at which incident light can be reflected through said outer lens in a predetermined direction, such that a surface of said reflex reflector and said internal surface of said housing are arranged on the same plane.

6. A lighting fixture as claimed in claim 5, wherein said ornamental plate is formed of a transparent amber resin member and integrally formed with said reflex reflector, and wherein said ornamental plate is subjected to an opaque process except for a region corresponding to said reflex reflector.

7. A lighting fixture as claimed in claim 5, wherein said reflex reflector is separately formed from said ornamental plate.

8. A lighting fixture as claimed in claim 5, wherein said ornamental plate has a fitting opening formed therein, said reflex reflector being united with said ornamental plate in one body, by being mounted in said fitting opening.

* * * * *